United States Patent Office.

JAMES DODD, OF PROVIDENCE, RHODE ISLAND, ASSIGNOR TO HIMSELF AND JOSEPH BROWN, JR., OF SAME PLACE.

Letters Patent No. 78,866, dated June 16, 1868.

IMPROVED COMPOSITION FOR PREPARING SIZING.

*The Schedule referred to in these Letters Patent and making part of the same.*

TO ALL PERSONS TO WHOM THESE PRESENTS MAY COME:

Be it known that I, JAMES DODD, of the city and county of Providence, of the State of Rhode Island, have invented a new and useful Composition to be Used for Improving Starch or the Sizing of Warps; and I do hereby declare the same to be fully described as follows:

The ingredients of the composition, with their proportions for six hundred pounds of starch or sizing, are as follows:

One ounce of carbonate of soda; sixteen ounces of common hard soap; two ounces of borax.

In combining the ingredients, the soap should first be melted or rendered fluent by heat, after which the carbonate of soda and the borax should be stirred into it. After they may have been thoroughly incorporated with it, the composition may be allowed to cool. It will then be ready for use.

To apply it to the starch, it should be mixed with it when the starch is in a heated or boiling state.

It has been found that it will cause the starch to work to better advantage, and not to harden on the rollers of the sizing-machine.

The carbonate of soda improves the drying qualities of the sizing. The borax operates to even the size, and the soap softens the yarn, and enables it to work better in the weaving of it.

I claim the above-described composition, as well as its combination with starch or sizing for warps.

JAMES DODD

Witnesses:
R. H. EDDY,
F. P. HALE, Jr.